United States Patent [19]
Nyilas et al.

[11] Patent Number: 5,795,135
[45] Date of Patent: Aug. 18, 1998

[54] SUB-SEA PUMPING SYSTEM AND AN ASSOCIATED METHOD INCLUDING PRESSURE COMPENSATING ARRANGEMENT FOR COOLING AND LUBRICATING FLUID

[75] Inventors: Charles P. Nyilas, Monroeville; Clifford H. Campen, Jr., Pittsburgh; Joseph M. Kujawski, Export, all of Pa.

[73] Assignee: Westinghouse Electric Corp., Pittsburgh, Pa.

[21] Appl. No.: 567,558

[22] Filed: Dec. 5, 1995

[51] Int. Cl.⁶ .................................................. F04D 17/00
[52] U.S. Cl. ............................ 417/53; 417/372; 417/540
[58] Field of Search .......................... 417/53, 372, 423.3, 417/423.8, 424.1, 424.2

[56] References Cited

U.S. PATENT DOCUMENTS

| | | | |
|---|---|---|---|
| 2,423,436 | 7/1947 | Blom | 417/423.3 |
| 2,682,229 | 6/1954 | Luenberger | 417/423.3 |
| 4,614,482 | 9/1986 | Gaffal | 417/373 |
| 4,932,848 | 6/1990 | Christensen | 417/423.13 |

*Primary Examiner*—Richard E. Gluck

[57] ABSTRACT

A sub-sea pumping system for pumping an effluent from a deep-sea wellhead comprising a topside module, a sub-sea module, and an umbilical connection between the topside and sub-sea modules. The umbilical connection comprises a threephase electrical power line and an hydraulic fluid supply line to an electrical canned motor. The hydraulic fluid is a single medium fluid, is compatible with the effluent being pumped, and is circulated through the sub-sea module for cooling and for lubricating the seal and bearing arrangements of the motor and the pump. The hydraulic fluid is circulated through a submerged pressure compensator which includes a metal bellows assembly. The compensator is responsive to the pressure of the effluent being pumped and pressurizes the hydraulic fluid flowing through the motor and the pump for the cooling and the lubricating of their respective seal and bearing arrangements at a pressure above the pressure of the effluent being pumped.

14 Claims, 4 Drawing Sheets

SUB-SEA PUMPING SYSTEM AND AN ASSOCIATED METHOD INCLUDING PRESSURE COMPENSATING ARRANGEMENT FOR COOLING AND LUBRICATING FLUID

BACKGROUND OF THE INVENTION

1. Field of the Invention

The invention relates to a pumping system and an associated method for the pumping of an effluent from a sub-sea well where the effluent is transported to a floating surface platform or to an on shore site for processing. More particularly, the invention relates to a sub-sea pumping station which may be a multiphase pumping station for pumping a multiphase effluent and which is used in conjunction with a deep-sea well head.

2. Background of Information

As shallow offshore oil and gas production well reservoirs are being depleted, more nations and/or companies are taking a greater interest in deep-sea offshore oil and gas reservoirs in which sub-sea multiphase pumping systems are used to extract and pump the oil and/or gas from these reservoirs.

A sub-sea multiphase pumping system transports a multiphase effluent, which generally consists of mixtures of oil, gas, and water, from a sub-sea pumping station over a long distance through a pipeline to a remotely located processing plant where the multiphase effluent is then separated into individual fluid components prior to further processing. This processing plant may be on a floating surface platform or may be on the land.

Worldwide, several different types of sub-sea multiphase pumping systems are currently being developed and each type of multiphase pumping system consists of the same basic components which are: a multiphase pump, a drive for the multiphase pump, a power supply system, a control system, a pressure compensating and maintenance system, and auxiliary lubricating and cooling circuits for the multiphase pump/drive unit. A sub-sea multiphase pumping system generally consists of one or more of these basic components which are mounted on a base and then lowered and installed onto sub-sea trees where they are connected to a deep-sea wellhead.

The types of pumps in use today in the multiphase pumping system are either a rotodynamic pump or a positive displacement pump as these types of pumps are generally able to handle more than one phase of effluents. In the deeper sea depths, preferably, the latter type of pump is used in that it is less sensitive to density and, therefore, less sensitive to the pressure variations of the multiphase effluent being pumped. Nevertheless, the sub-sea multiphase pump is required to maintain or increase the production rate of the multiphase effluent regardless of whether the well pressure is high or low.

The drive for the multiphase pump may be a hydraulic turbine or a variable speed electric motor, the latter having been determined to be more power efficient, more flexible in operation, and less sensitive to its remoteness from the power source.

For a hydraulic turbine, either pressurized water or oil is used to drive it. The system for the pressurized water or oil is located on the floating surface platform, and several conduit feed lines are connected from this pressurized system to the sub-sea unit. Additionally, a barrier fluid system, which is generally different than the process and turbine fluids, is provided for cooling and for lubricating the bearings in the multiphase pump/drive unit and for compensating for the varying pressures in the system. This barrier fluid is routed to the floating surface platform where it is cooled and then returned to the sub-sea unit, and is maintained from the topside platform at a pressure greater than that of the process fluid so that any leakage that occurs will be of the barrier fluid either into the sea or through the mechanical seals into the process fluid.

If pressurized water is used to drive the hydraulic turbine, then the shaft seals between the turbine and the multiphase pump can be eliminated allowing the water in the turbine to flow through the close-clearance axial gaps in the shafting between the turbine and the multiphase pump and into the production or process fluid which, as discussed above, is the multiphase effluent being pumped. In this application, the barrier fluid may also be water which circulates through the multiphase pump and through the turbine housing. The pressure compensation occurs in that the barrier fluid leakage from the turbine flows into the multiphase pump and into the process or production fluid in the pump and finally into the seawater. The barrier fluid, in effect provides a back-pressure to the lubricating side of the seals to insure that the linkage is into the process fluid or into the turbine fluid side of the seals.

If oil is used to drive the hydraulic turbine, then seals are used to separate the compartment for the turbine fluid from that of the multiphase effluent being pumped. Generally, oil is also used as the barrier fluid for cooling and lubricating the bearings in the multiphase pump/drive unit and for compensating for the varying pressures in the inlet of the multiphase pump. Even though the barrier fluid is compatible with both the fluid in the turbine and the multiphase effluent being pumped, one of the disadvantages of this system is that small amounts of oil tend to leak into the surrounding seawater thereby creating an environmental problem.

Even though the hydraulic turbine multiphase pumping systems are considered by some as being mechanically and hydraulically simple in design and simple to maintain, the topside facilities for these types of pumping systems are required to support extensive systems for the power source, the hydraulic source, and the barrier fluid system.

The problem with these facilities is that their power consumption increases dramatically with increased pressure drop as the umbilical feed lines lengthen. That is, as the sub-sea stations go deeper and are located further from their floating surface platform, the hydraulic line losses for the hydraulically turbine driven multiphase pump increases. In general, the more removed the energy source is from the sub-sea station, the more complex the recirculating umbilical feed lines and, therefore, the more costly it is to provide this type of boosting system for extracting a multiphase effluent from the deep-sea well.

Some system designers have recognized that for deeper wells, submerged motors provide a more economical alternative to the hydraulic turbine drive. In one such system, an electro-submersible pump has its motor, and in some applications, a transformer located on the sub-sea station. The motor/pump unit can both be oil cooled, or the motor can be water cooled and the pump can be oil cooled. In the first system where the oil is the sole lubricating and cooling agent, the oil system also provides the pressurization of the system to prevent the back leakage of fluid from the pumped fluid, and the oil is transported to an air cooled cooling unit on the floating surface platform. Even though this system is the simpler of the electrical driven systems, it still requires umbilical feed and return lines which recirculate the cooling medium to the cooling unit on the floating surface platform and back to the sub-sea station.

In the second system where the motor is water-cooled and the pump is oil-cooled, there is an oil cooling circuit for the multiphase pump bearings and seals, and a water-glycol circuit for the submerged electric motor bearings and seals. The shaft seal leakage from each lubricating circuit enters a chamber between the motor and pump which houses the coupling for the motor and pump. The oil and water-glycol mix is collected in a leak-off tank. The water-glycol and oil solutions are periodically pumped to the floating surface platform where they are separated and recycled back to their respective sub-sea supply tanks. Each of the supply tanks have a bladder-type diaphragm which communicates with the oil supply tank, which, in turn, is in communication with the pump suction and which, therefore, regulates the pressure in the other tanks, resulting in all three tank pressures being equalized to the pump suction pressure during all modes of operation of the system regardless of the external pressure and water depth. A sub-sea heat exchanger for the oil and a sub-sea heat exchanger for the water-glycol transfer their heat loads to the surrounding water, and auxiliary impellers attached to the main drive train circulate the two coolant fluids through the motor and the pump whenever the motor is running. The umbilical connections between the sub-sea station and the floating surface platform comprise a three-phase electrical feed, a makeup oil line to the oil supply tank, a makeup water-glycol line to the water-glycol supply tank, and a leak-off line to the oil/water-glycol separator unit resulting in an increase in the size of the umbilical connections and therefore, a complex design for this two fluid system. In general, the current technologies which feature sub-sea motors employ wet winding motors whose windings are directly cooled by the hydraulic cooling circuit medium which generally is oil. A disadvantage to using a wet winding motor is that the direct contact of the windings with the coolant reduces the long-term reliability of the motor even though special insulating materials are being used. Failure of the motor results in a substantial loss of production and increased maintenance costs in that in order to resume operation, the sub-station must be removed and replaced.

For a deep-sea well there is a continuing interest in submerged electrical motor driven pumps for the pumping of an effluent, which may be a multiphase effluent. However, these present system designs are costly and complex, and require a great degree of maintenance and manned topside support for their operation.

There remains, therefore, a need in the art to simplify the design for a sub-sea single or multiphase pumping system, to decrease the costs involved in providing a sub-sea single or multiphase pumping system, and to provide a more technically superior and economically advantageous single or multiphase pumping system.

There is a further need to provide a sub-sea single or multiphase pumping system which is substantially maintenance-free, requiring very little or no human intervention for its operation, and which has an increased life expectancy compared to present-day systems.

SUMMARY OF THE INVENTION

The present invention has met the above needs. The present invention provides a sub-sea pumping system which may be multiphase or single and an associated method for pumping an effluent which may be multiphase or single. The system employs a single medium fluid as a coolant and lubricator and comprises a canned electrical motor, a single or multiphase pump connected to the canned electrical motor, and a combination heat exchanger and pressure compensator located on a sub-sea module. The pressure compensator, preferably, is a bellows device which is responsive to the pump pressure and which keeps the single fluid medium travelling through the motor/pump unit for cooling and lubricating the bearings and seals in the motor/ pump unit at a pressure generally greater than the suction pressure. A topside module on a floating surface platform has a power supply source and a single medium source. A first umbilical connection consists of a set of three-phase leads and connects the power source to the electrical canned motor, and a second umbilical connection consists of an hydraulic line and connects the single medium source to the canned electrical motor. The single medium fluid is compatible with the effluent being pumped from the deep-sea well and, preferably, this single medium fluid is oil if the multiphase effluent being pumped is multiphase and a mixture of oil, gas, and water. Preferably, this single medium fluid is also used in the pressure compensator. The pressure compensator autonomously operates the pumping system under water by adjusting the pressure of the single medium fluid circulating through the system to the suction pressure of the pump and maintains the pressure of the single medium fluid circulating through the system at an amount greater than the suction pressure of the pump. The internal cooling and lubricating of the bearings and seals of the motor pump unit are generated by auxiliary pumps which operate directly off of the main motor drive, thereby featuring passively operating auxiliary hydraulic circuits which result in a maintenance-free sub-sea pumping station module. The topside module on the floating surface platform is unmanned which not only meets, but exceeds the service-free life expectancy of a deep-sea production well pumping station. The single medium fluid flows into the effluent in the pump and the amount consumed by the system is very minimal requiring the single medium fluid to be replaced every year or so depending on the capacity of the supply source on the topside module.

It is, therefore, an object of the present invention to provide a sub-sea pumping system and associated method for the pumping of a effluent from a deep-sea well which is an hydraulically solid pumping system which uses a single medium fluid which is pressurized to the pump inlet by a pressure compensator which maintains a completely filled hydraulic cooling and lubricating circuit within the motor and the pump unit.

More particularly, the system of the present invention employs a single medium fluid as a coolant, a lubricator, and as the fluid in the pressure compensator, and is compatible with the effluent being pumped.

It is a further object of the present invention to provide a sub-sea pumping system which is simple in design with a limited number of components; which is less costly, smaller, more compact, and more efficient than present-day designs; and which operates unmanned and autonomously at any sea depth for an extended period of time.

It is still a further object of the present invention to provide a pressure compensator which employs a bellows assembly.

These and other objects of the present invention will be fully understood and better appreciated from the following description of the invention on reference to the illustrations appended hereto.

BRIEF DESCRIPTION OF THE INVENTION

DESCRIPTION OF THE PREFERRED EMBODIMENT

Figure 1:
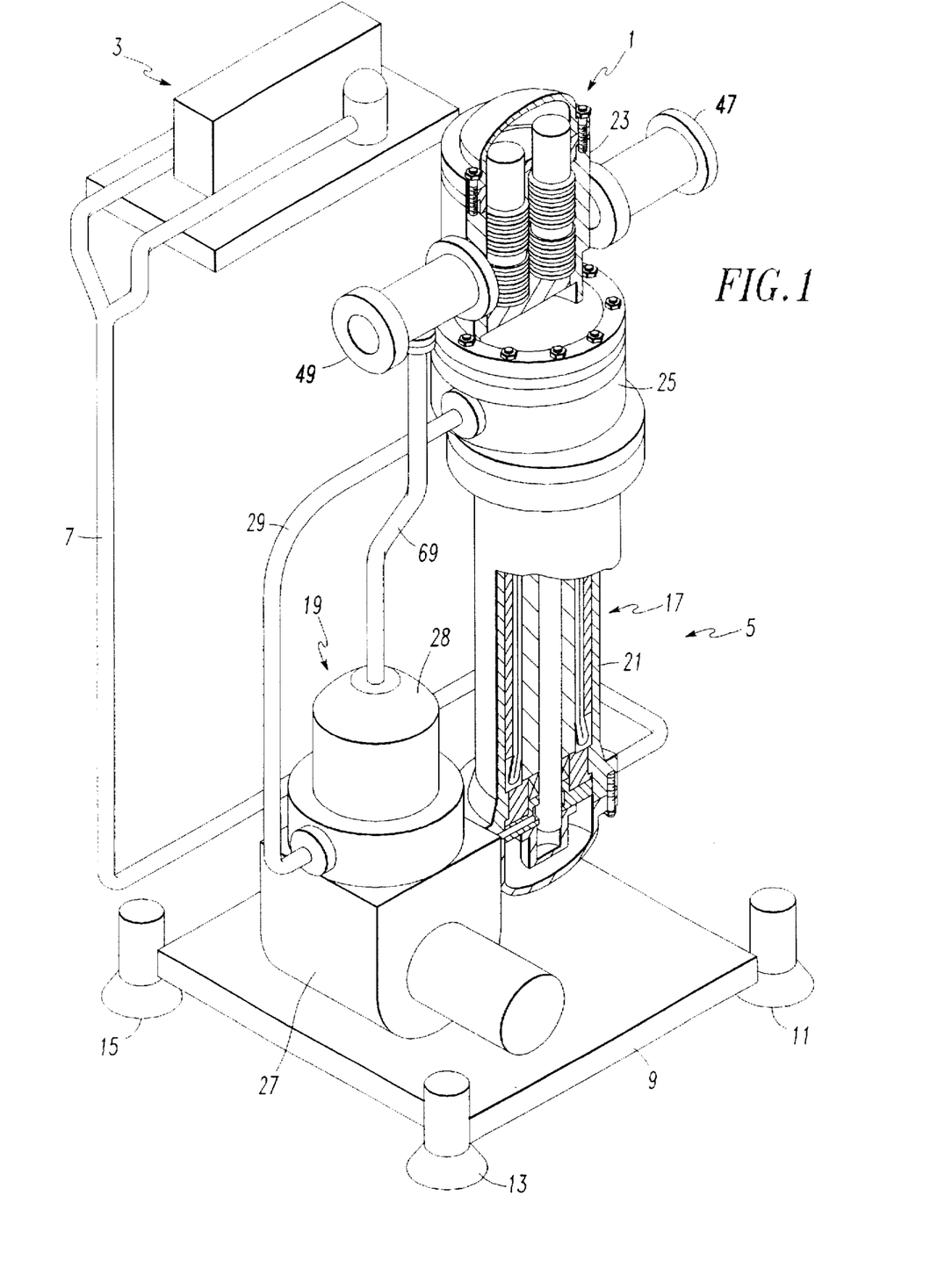
FIG. 1 is a perspective view illustrating the sub-sea pumping system of the present invention.

Referring first to FIG. 1, there is shown a sub-sea pumping system 1 of the present invention which comprises a topside module generally indicated at 3, a sub-sea module generally indicated at 5, and an umbilical connection, generally indicated at 7, which hydraulically and electrically connects the several components of the topside and sub-sea modules 3, 5, respectively. The topside module 3 may be supported on a floating surface platform (not shown) which may also support the production station. For the pumping system 1 of FIG. 1, the operating and maintenance personnel are generally located on shore or on a host platform, and the pumping system 1 is designed to operate in an unmanned mode.

The sub-sea module 5 has a mounting base 9 which is supported on a wellhead tree structure (not shown) which usually rests on the sea floor. Mounting base 9 consists of several funnel-type guide posts, located at its corners, some of which are shown at numerals 11, 13, and 15, and which are used to align the sub-sea module 5 over the wellhead tree structure. Mounting base 9 provides a structural framework for the physical protection of the system 1 of FIG. 1 during its handling operations for its ultimate installation on the wellhead tree structure. The structural framework is such that it is counter-balanced to insure that the sub-sea module 5 is capable of being lowered onto its wellhead guide posts in a generally horizontal position.

Still referring to FIG. 1, mounting base 9 of sub-sea module 5 supports units 17 and 19. Unit 17 houses a motor 21 and a multiphase pump 23 which are integrally connected by a transition housing 25, which provides a flexible coupling between motor 21 and pump 23. Unit 19 is hydraulically connected to transition housing 25 by an hydraulic conduit 29.

Umbilical feed line 7 hydraulically and electrically feeds from topside module 3 to motor 21 on sub-sea module 5.

Further details with regard to the several components of sub-sea module 5 will now be given with reference to FIG. 2 where it is shown that unit 19 houses a heat exchanger 27 and a pressure compensator 28, and where these numbers appear in FIG. 1.

Figure 2:
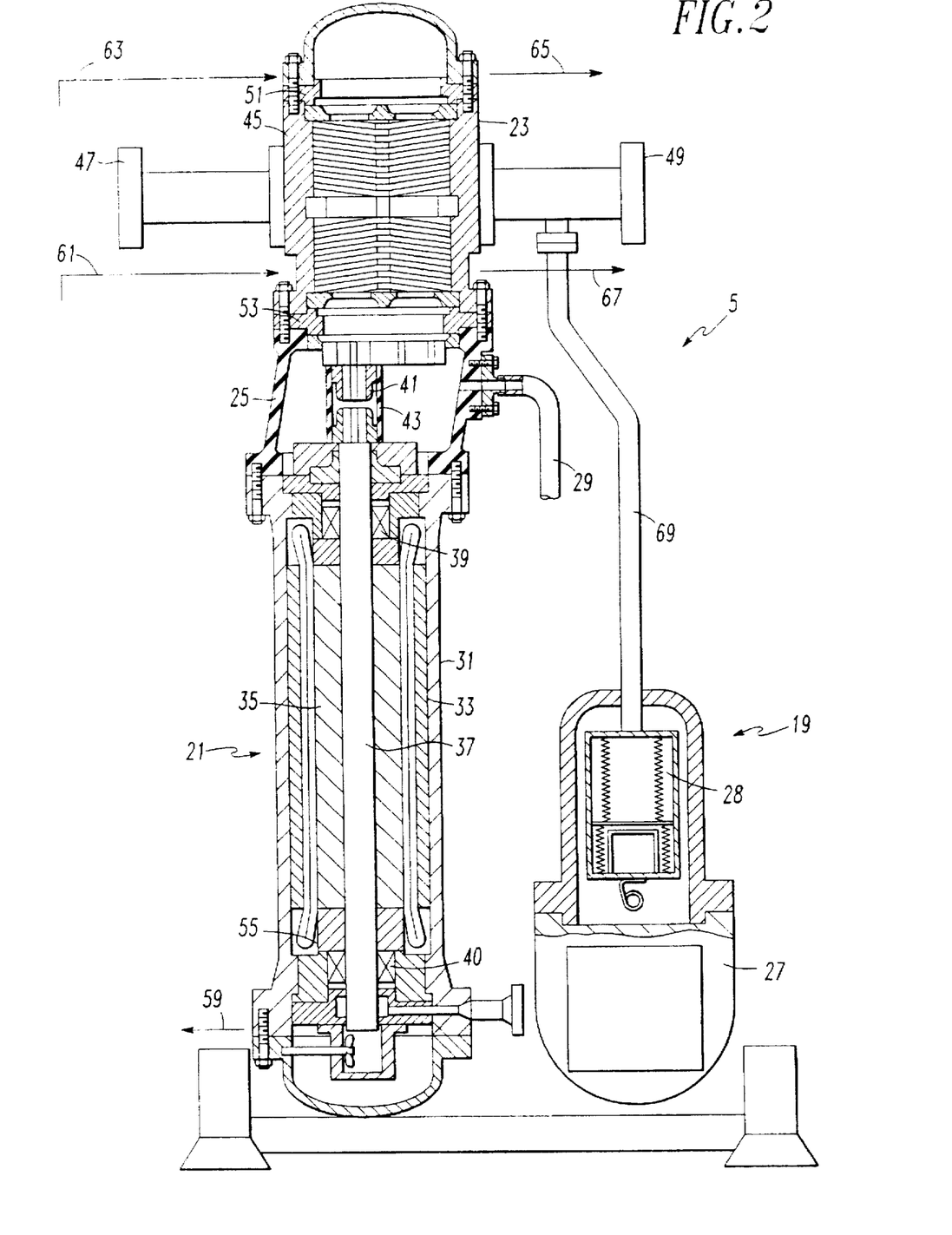
FIG. 2 is a schematic, cross-sectional view of the main components of the sub-sea module of the present invention of FIG. 1.

Referring to FIG. 2, motor 21 is, preferably, an electrical variable speed motor with a high voltage that does not require a submerged transformer or step gear. This requirement is realized by a Westinghouse canned motor which is well-known in the art and which is further disclosed in U.S. Pat. Nos. 5,101,128; 5,185,545; 5,220,231; and 5,252,875. Motor 21 is chosen to operate in a speed range of 25% to 100% and provides a constant shaft output torque. Motor 21 basically is comprised of a housing 31, a stator can 33, a canned rotor 35 with a shaft 37, upper seal and bearing arrangement 39 and lower seal and bearing arrangement 40.

Shaft 37 of motor 21 is mechanically connected to shaft 41 of multiphase pump 23 through flexible coupling 43 in transition housing 25 which, in turn, is bolted to housing 31 of motor 21 and housing 45 of multiphase pump 23. Multiphase pump 23 is coupled to motor 21 and is selected to be ideally suited for the transport of a multiphase effluent consisting perhaps of mixtures of oil, gas, and water. Multiphase pump 23 may be a twin screw type pump, a helico-axial type pump, or any type of pump for pumping a multiphase effluent with oil and gas mixtures up to 95% GVF (gas volume fraction), or higher.

Multiphase pump 23 has an upper seal and bearing arrangement 51 and a lower seal and bearing arrangement 53.

The types of multiphase pumps which can be used in the present invention are available in the market place and are well-known to those skilled in the art and, therefore, no further description of multiphase pump 23 is necessary for a complete understanding of the invention.

Still referring to FIG. 2, multiphase pump 23 is connected to a valve of a wellhead tree structure (not shown) supporting mounting base 9 via a suction inlet 47 which draws the multiphase effluent being pumped out of the wellhead and discharges the pumped fluid through discharge outlet 49 from where the multiphase effluent is transported through a pipeline to a production station in a well-known manner.

Referring to FIGS. 1 and 2, hydraulic feedline 7 of FIG. 1 delivers hydraulic fluid, preferably oil, into the base of motor 21, whereby auxiliary impellers (not shown) which are mounted on shaft 37 of motor 21 in a well-known manner circulate the hydraulic fluid into lower seal and bearing arrangement 40 between the canned stator 33 and canned rotor 35, through upper seal and bearing arrangement 39 for their cooling and lubrication, and into transition housing 25 from where the hydraulic fluid is then conveyed by conduit 29 into unit 19 housing the heat exchanger 27 and pressure compensator means 28. While this hydraulic fluid is being pumped through motor 21, it is also being delivered into the seal and bearing arrangements 51 and 53 of multiphase pump 23. Even though not shown in FIG. 2, a system of hydraulic fluid delivery conduits represented by arrows 59, 61, and 63 delivers the hydraulic fluid being supplied into motor 21 from topside module 3 of FIG. 1 into multiphase pump 23 for delivering the hydraulic fluid to upper and lower seal and bearing arrangements 51 and 53 of pump 23 for their cooling and lubrication. A system of hydraulic fluid discharge conduits represented by arrows 65 and 67 convey the hydraulic fluid from multiphase pump 23 into unit 19 along with the hydraulic fluid passing through motor 21 and being discharged from transition housing 25 via hydraulic line 29. In unit 19, the hydraulic fluid is cooled by heat exchanger 27 and is used by pressure compensator 28 to maintain the pressure in pumping system 1, more about which will be discussed hereinbelow. Hydraulic fluid is only pumped through motor 21 and multiphase pump 23 when the motor 21 is being operated since the auxiliary impellers (not shown) are mounted on motor shaft 37, thereby eliminating the need for additional pumps and separate power sources.

The present invention preferably uses a single medium fluid, such as oil as the hydraulic fluid for lubricating and cooling the seal and bearing arrangements 39, 40, and 51, 53 of motor 21 and pump 23, respectively, since it is compatible with the multiphase effluent being pumped in that the multiphase effluent consists of an oil mixture. Any oil leakage through the seal of seal and bearing arrangements 39, 40, and 51, 53, of motor 21 and pump 23, respectively during the cooling and lubricating process will flow into the multiphase pump 23, thereby eliminating the need for a separate leak-off hydraulic circuit or for separators which are required for pumping systems which employ combinations of water, water-glycol, oil and gas systems for cooling, lubricating, and pressure control.

Still referring to FIG. 2, the hydraulic fluid from the internal hydraulic circuits of pump 23 and motor 21 cycles through heat exchanger 27 which transfers the heat load in the hydraulic fluid generated by motor 21 and pump 23 into the surrounding sea water. Heat exchanger 27 may be a single pass or multi-pass type the latter requiring a lesser amount of oil, thereby reducing the weight, size and cost of the sub-sea module 5 of FIG. 1. They type of heat exchanger will depend on the heat load and the space allocation of the design.

Figure 3:
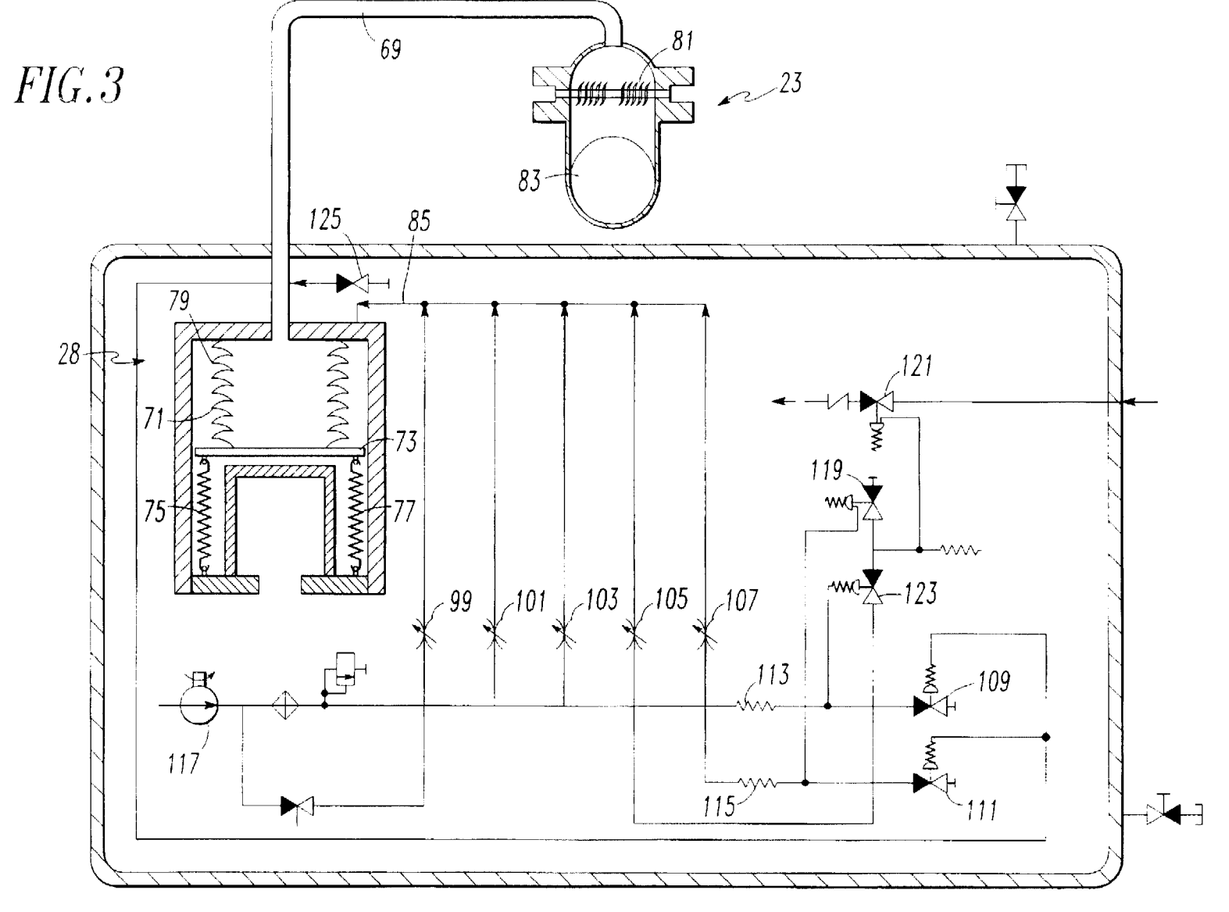
FIG. 3 is a schematic showing a part of the hydraulic circuit for the hydraulic fluid between the pump and the pressure compensator means for the sub-sea module of FIG. 1.

Referring now to FIG. 3, as discussed thereabove, unit 19 includes a pressure compensator 28. Pressure compensator 28 is connected to pump 23 through a suction pressure sense line 69. Preferably, pressure compensator 28 comprises a metal bellows assembly indicated at numeral 71. Bellows assembly 71 comprises a welded stainless steel diaphragm 73, tension springs 75 and 77, and a plurality of leaves, one of which is indicated at numeral 79. Tension springs 75, 77 are connected to diaphragm 73 and are designed such that bellows assembly 71 is able to displace at least two gallons per minute of the hydraulic fluid to the seal and bearing arrangements 39, 40 and 51, 53 of motor 21 and pump 23, respectively. The leaves 79 are connected to diaphragm 73 on a side opposite to tension springs 75 and 77.

Preferably, leaves 73 are of alternating thick and thin material, are welded together, and are made of stainless steel. The thin material provides for good axial compliance and flexibility of the bellows assembly 71, and the thick material provides a degree of stiffness to resist collapse of the bellows assembly 71 from the higher external pressure which may be generated by the surrounding environment and water depths.

Still referring to FIG. 3, the suction pressure line 69 communicates to bellows assembly 71 the pressure of the multiphase effluent being pumped out of discharge outlet 49 (FIG. 2). This suction pressure sense line 69 from pump 23 to bellows assembly 71 includes a perforated plate 81 which is located out of the direct line of solids passing through the pump suction area 83. Plate 81 is designed to minimize the possibility for the solids in the multiphase effluent being pumped through unit 17 of FIG. 1 to plug up the pressure communication line between the pressure compensator 28 and the pump suction area 83. The suction pressure sense line 69 communicates any changes which may occur in the static pressure of the multiphase effluent being pumped in sub-sea module 5 of FIG. 2 without attenuation to the bellows assembly 71, that is, without loss of pressure in bellows assembly 71. Where the internal side of bellows assembly 71 sees the pump suction pressure, the external side of bellows assembly 71, as indicated at numeral 85, is open to the pressure in the motor 21 and pump 23, and adjusts the internal pressure of the hydraulic fluid in the system for cooling and lubricating the seals and bearing arrangements 39, 40 and 51, 53 of motor 21 and pump 23, respectively, to the pump suction pressure in a manner which will be discussed hereinbelow.

The pressure compensator 28, preferably, is located as close as possible to the pump 23 so that the hydraulic connections 61, 63 (FIG. 2) to the seal and bearing arrangements 51 and 53 are relatively short in order to improve the response to the motor pump side pressure of bellows assembly 71 to the transient changes in the pump suction side of assembly 71.

Figure 4:
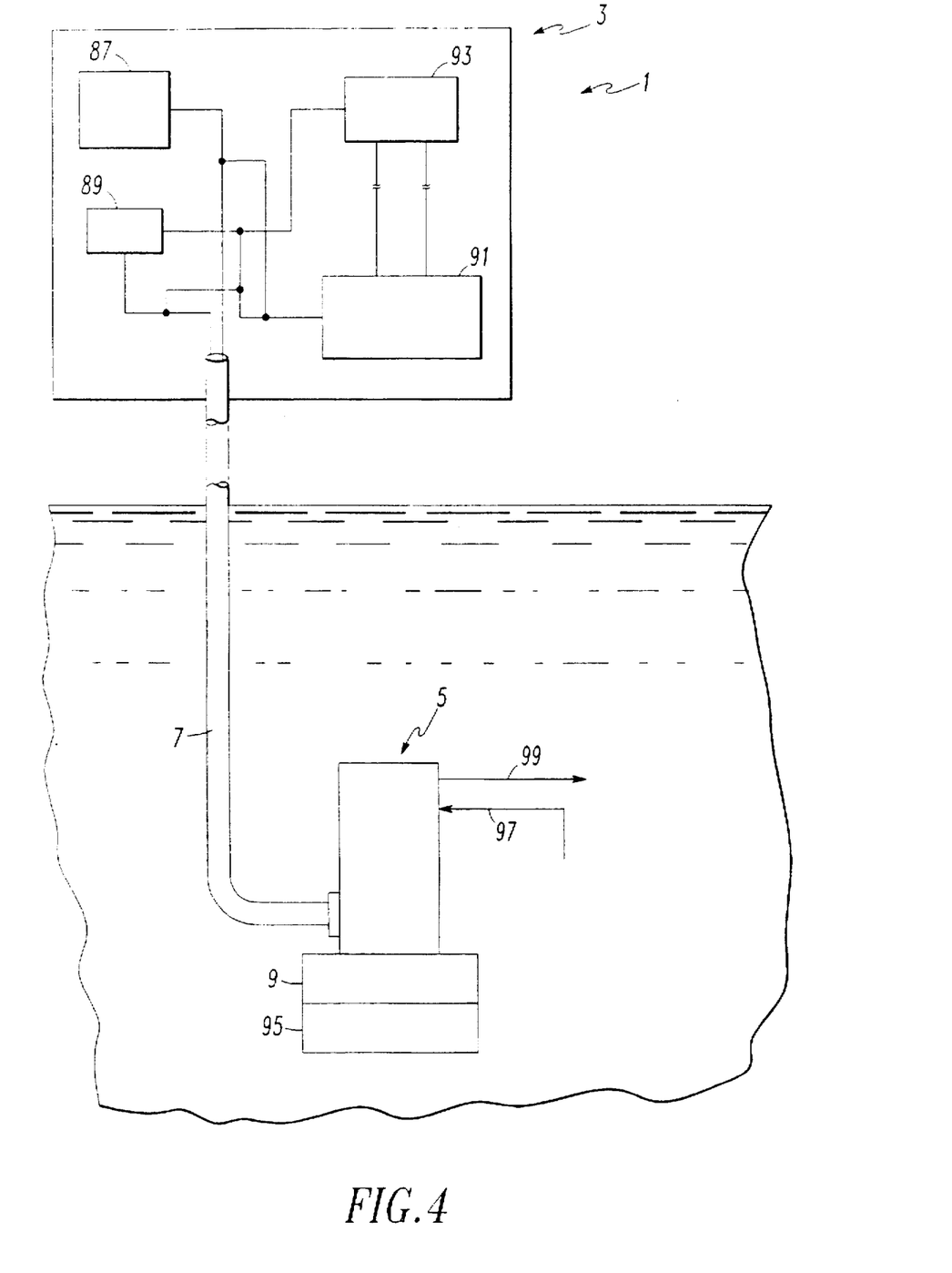
FIG. 4 is a schematic illustrating the components of the topside module and the connection of the topside module to the sub-sea module of the pumping system of FIG. 1.

Referring now to FIG. 4, there is shown in further detail the components for the topside module 3 of FIG. 1. These components are a makeup hydraulic supply tank 87, an electrical power source 89, a control system 91, and a monitoring system 93. Preferably, systems 91 and 93 are located on-shore or on the production platform where control system 91 is optional and maybe tied into the output of the system 1 of FIG. 1 on the production platform.

Supply tank 87 and electrical power source 89 are physically supported by the topside module 3 of FIG. 1 where, as discussed hereinabove, umbilical connection 7 delivers both the hydraulic fluid and the power to sub-sea module 5 which, in turn, is connected to welltree 95 only shown in FIG. 4. An arrow indicated at 97 represents the multiphase flow from the well into sub-sea module 5, and an arrow indicated at numeral 99 represents the multiphase flow from sub-sea module 5 to the production platform (not shown).

With regard to component 89 of topside module 3 in FIG. 4, the electrical power source is preferably a three-phase variable frequency drive motor and is electrically connected in a well-known manner to the power generating equipment located on the production platform. The makeup oil system, comprising hydraulic fluid supply tank 89, provides a constant pressure to the sub-sea multiphase pumping system 1, and periodically replenishes the inventory of the hydraulic oil in sub-sea module 5. In addition to supply tank 87, the makeup oil system, preferably, includes a piston pump (not shown) which is pressurized by the platform maintenance personnel to maintain a constant pressure on the discharge end of supply tank 87. This pressure combined with the static elevation of the platform relative to that of sub-sea module 5 provides adequate pressure in make-up line 7 to fill the sub-sea module 5. The in-flow of hydraulic fluid to sub-sea module 5 is, therefore, automatic whenever the hydraulic fluid inventory in sub-sea module 5 falls below the pressure regulator setting of the fill valve (not shown) to sub-sea module 5. The fill cycle is expected to repeat about every three days.

Preferably, the makeup hydraulic supply tank 87 holds about 100 gallons, which, at the expected leak rates of the hydraulic fluid from the pump shaft seals and the system relief valve into the pump suction area 83 of FIG. 3, would require a refill about twice a year. This refill operation would have to be performed by an operator and would be the only maintenance requiring human intervention during the operating life of the system 1 of FIGS. 1-4. Otherwise, multiphase pumping system 1 of FIG. 1 is essentially autonomous.

With reference to FIGS. 1 through 4, bellows assembly 71 acting as a pressure compensator permits springs 75 and 77 to load the compensator such as to provide a positive pressure in pump 23 which is greater than the wellhead pressure. This difference in pressure where the pump pressure is greater than the wellhead pressure is referred to as the "seal pressure bias." The stiffness of springs 75, 77 combined with the displacement of bellows 71 allows for the development of a system for supplying hydraulic fluid from makeup hydraulic supply tank 87 of FIG. 4 to motor 21 and pump 23 of sub-sea module 5 based on changes in the "seal pressure bias." When the hydraulic fluid in motor 21 and pump 23 is low relative to a preset limit, the suction pressure in sense line 69 causes bellows assembly 71 to be extended and the springs 75, 77 to be compressed wherein the seal pressure bias can be considered as being slack or low. This low seal pressure bias is used in the system to signal the hydraulic system, through a system of valves (FIG. 3) to begin to deliver hydraulic fluid to the seal and bearing arrangements 39, 40 and 51, 53 of motor 21 and pump 23, respectively, until the preset limit for the hydraulic fluid in sub-sea module 5 is reached. As motor 21 and pump 23 are being filled to this preset limit for the hydraulic fluid from supply tank 87 of FIG. 4, bellows assembly 71 becomes more compressed and springs 75, 77 are stretched. As springs 75 and 77 stretch, the pressure in motor 21 and pump 23 rises and the hydraulic fluid continues to be delivered until the pressure in motor 21 and pump 23 reaches a set point pressure above the pump suction pressure. This stretching of springs 75, 77 is sensed in the hydraulic system and is used as a signal to interrupt the flow of hydraulic fluid from makeup supply tank 87 to unit 17 containing motor 21 and pump 23.

Referring again to FIG. 3, there is shown a schematic of the hydraulic system for the hydraulic fluid for lubricating and cooling seal and bearing arrangements 39, 40, and 51, 53 of motor 21 and pump 23, respectively, of FIG. 2. Valves for these hydraulic connections are indicated at numerals 99, 101, 103, 105, and 107 in FIG. 3.

The hydraulic system of FIG. 3 utilizes a pair of back pressure regulating valves 109 and 111 in conjunction with orifices 113, 115 to form a pair of pressure sensing relays. Each of the valves 109, 111 is equipped with a sensing piston that is referenced on its one side to the pump suction pressure, and on its opposite side to the pump/motor internal pressure. Consequently each valve 109, 111 references the differential pressure between the hydraulic fluid in motor 21 and pump 23 and the pump suction pressure. Each valve 109, 111 has a range spring set to establish a setpoint. Valve 109 has the characteristic that it is closed at pressures below their set points and opened above these set points. Since they are referenced to the suction pressure, these setpoint pressures are above the pump suction pressure.

Valves 109, 111 are in series with orifices 113, 115, respectively. When each valve, 109, 111 is closed, there is essentially no fluid flow, and the pressure down stream of each orifice 113, 115 is equal to the pressure at the discharge of a hydraulic pump 117 (400–600 psig higher than the pressure of the hydraulic fluid in motor 21 and pump 23). Likewise, when each of the valves 109, 111 opens, flow through the orifices 113, 115 decreases the pressure downstream of each orifice to essentially the pressure of the fluid in motor 21 and pump 23. Valves 119, 112 are normally closed valves which require a pressure higher than the pressure of the hydraulic fluid in motor 21 and pump 23 when applied to their diaphragm or piston for their opening. Likewise, valve 123 is a normally open valve requiring a pressure higher than the pressure of the hydraulic fluid in motor 21 and pump 23 for its closing. When pump 117 is operated by main motor 21 there is a high pressure to the inlet to valve 123 and to each of the orifices 113, 115. If the pressure of the hydraulic fluid in motor 21 and pump 23 is below 30 psig above pump suction pressure, then valve 109 will be open, and there will be no pressure on the operator (piston or diaphragm) of valve 123. The pressure of the hydraulic fluid in motor 21 and pump 23 will also be below the setpoint of valve 111, and valve 111 will be open. In this case there is a pressure drop across orifice 115. The consequence of low pressure between orifice 115 and valve 109 is that the operator of valve 119 is not pressurized. Valve 119, a normally closed valve, is closed permitting the operator supply line to valve 121 to be pressurized. High pressure from pump 117 through valve 123 pressurizes the operator (piston or diaphragm) of valve 121. This valve 121 opens and hydraulic fluid flows from the umbilical supply line 7 (FIG. 4). The umbilical line 7 is pressurized to assure that this is sufficient pressure for hydraulic fluid to flow into the motor 21 and pump 23. As hydraulic fluid flows into the motor 21 and pump 23 the bellows assembly 71 is compressed. The action of compressing the bellows assembly 71 stretches the bias springs 75, 77 and the pressure of the hydraulic fluid in motor 21 and pump 23 rises relative to the suction pump pressure. As the pressure of the hydraulic fluid in motor 21 and pump 23 rises above the setpoint of valve 109, this valve 109 closes. Closing valve 109 shuts off the flow through orifice 113 and valve 123 closes. When valve 123 closes, pressure is trapped in the operator of valve 121 and hydraulic fluid continues to flow from the umbilical line 7 into the motor 21 and pump 23.

The hydraulic fluid continues to flow into the motor 21 and pump 23 until the pressure exceeds the setpoint of valve 111. At that point valve 111 closes and the flow through the orifice 111 stops. The pressure down stream of orifice 115 rises to the level of the output of pump 117. Valve 119, connected to the downstream of orifice 115, opens. This vents the pressure from valve 121 and permits it to close stopping the supply flow of hydraulic fluid down the umbilical line 7.

A relief valve 125 is provided to cope with certain operational situations. Typically, when managing an oil field, portions of the field are shutdown while draining other areas. When the sub-sea system 1 (FIG. 1) is restarted after a long idle period, it is likely that hydraulic fluid leaking out of the arrangements 39, 41, 51, 53 will reduce the precharge to essentially zero. At that time, as soon as motor 21 has sufficient speed to pressurize valve 121, the system will fill. The system fills in a fairly short period of time, say, roughly 1 to 2 minutes. While filling, subsequently the temperature of the motor 21 and pump 23 will increase until the heat exchanger 27 reaches equilibrium with the surrounding ocean and the remaining hydraulic fluid in the motor 21 and pump 23 expands.

As the system 1 of FIGS. 1–4 operates, hydraulic fluid leakage through the seal and bearing arrangements 39, 40 and 51, 53, respectively, of motor 21 and pump 23 will flow into the multiphase effluent being pumped in pump 23, resulting in the pressure in motor 21 and pump 23 dropping, bellows assembly 71 expanding, and springs 75 and 77 contracting. Since the extension of springs 75, 77 is reduced, the pressure of the hydraulic fluid in motor 21 and pump 23 decreases relative to the pump suction pressure. When the pressure in motor 21 and pump 23 drops below the minimum setting, which generally will be above the suction pump pressure, the hydraulic system of FIG. 3 begins the cycle again, whereby the hydraulic fluid is delivered from makeup supply tank 87 to the seal and bearing arrangements 39, 40 and 51, 53, respectively, of motor 21 and pump 23. Relief valve 125 (FIG. 3) in the hydraulic system of FIG. 3 avoids over-pressurization and premature wear of the seals of the seal and bearing arrangements 39, 40 of motor 21 and 51, 53 of pump 23.

Assuming continuous operation of system 1 of FIG. 1, it is expected that hydraulic fluid from makeup supply tank 87 to sub-sea module 5 will be lost at an estimated rate of about 2.5 liters per day. The topside module 3, through the hydraulic system, is expected to deliver about 2 gallons of hydraulic fluid to sub-sea module 5 about every third day.

with makeup supply tank 87 being refilled by an operator about one, two, or three times a year. It is important to appreciate that the hydraulic fluid from supply tank 87 leaks into the process fluid and is reclaimed, and that the leakage does not leak into the environment.

Referring again to FIG. 4, the monitoring of the operation of system 1 will be performed from the production platform control room. The power levels for motor 21 and the head and flow of the multiphase effluent being pumped will be monitored during the pumping production process. The ambient water temperatures will be sufficient to provide adequate cooling of the components of sub-sea module 5.

The sub-sea multi-phase system 1 of the present invention is a hydraulically solid pumping system in that it is a completely filled or closed "solid" (no gas pressurization) hydraulic system. System 1 uses a single medium fluid which is pressurized to the pump inlet by pressure compensator 28 which maintains a completely filled hydraulic cooling and lubricating circuit within the motor 21 and the pump 23.

It is to be appreciated that even though the invention has been addressed herein to a multiphase pumping system, it can be used in a single phase pumping system.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A sub-sea pumping system connected to a wellhead for pumping an effluent from a seabed well, comprising:
   a submerged pump connected to said wellhead for pumping said effluent at a predetermined pump pressure,
   a submerged electrical canned motor unit including a housing for operating said pump,
   a single medium means for delivering a single medium fluid to said submerged pump and said submerged electrical canned motor for cooling and lubricating said pump unit and said electrical canned motor, and
   a submerged pressure compensator means outside the housing of the submerged electrical canned motor, in fluid flow communication with the submerged pump and the submerged electrical canned motor, responsive to said pump pressure, and including means for pressurizing said single medium fluid at a pressure above said pump pressure for conveying said single medium fluid through said submerged pump and said submerged electrical canned motor.

2. A sub-sea pumping system of claim 1, wherein said pressure compensator means includes a bellows assembly.

3. A sub-sea pumping system of claim 1, further comprising:
   a submerged heat exchanger means associated with said submerged pressure compensator means for removing the heat from said single medium fluid and transferring said heat into the surrounding sea water.

4. A sub-sea pumping system of claim 1, wherein said submerged pressure compensator means is located adjacent to at least said pump and said electrical canned motor unit.

5. A sub-sea pumping system of claim 1, wherein said single medium fluid is compatible with said effluent being pumped.

6. A sub-sea pumping system of claim 1 wherein said effluent is a multiphase effluent containing of oil, gas, and water, and
   wherein said single medium fluid is oil.

7. A sub-sea pumping system connected to a wellhead for pumping an effluent comprising:
   a sub-sea module comprising:
      a submerged pump connected to said wellhead for said pumping of said effluent at a predetermined pump pressure,
      a submerged electrical canned motor unit including a housing connected to said pump for operating said pump,
      single medium means for delivering a single medium fluid to said submerged pump and said submerged electrical canned motor unit for cooling and lubricating said pump and said motor unit,
      a submerged pressure compensator means located adjacent to at least said pump and said canned motor outside the housing of the submerged electrical canned motor, in fluid flow communication with the submerged pump and the submerged electrical canned motor, including a bellows assembly responsive to said pump pressure, and including means for pressurizing said single medium fluid at a pressure above said pump pressure for conveying said single medium fluid through said submerged pump and said submerged electrical canned motor, and
      a submerged heat exchanger means associated with said bellows assembly of said submerged pressure compensator means for removing the heat from said single medium fluid and transferring said heat into the surrounding sea water,
   a topside module comprising:
      a power supply means and control system for supplying electrical power to said sub-sea module, and
      a single medium supply source for supplying said single medium fluid to said single medium means, and
   umbilical feed connection means for connecting said topside module to said sub-sea module for delivering said electrical power to said submerged electrical canned motor and for delivering said single medium fluid to said sub-sea module,
   said single medium being compatible with said effluent.

8. A sub-sea pumping system of claim 7, wherein said effluent is a multiphase effluent comprising a plurality of fluids consisting of mixtures of oil, gas, and water.

9. A sub-sea pumping system of claim 8, wherein said submerged pump is a multi-phase pump, and wherein said single medium is oil.

10. In a method of pumping an effluent from a seabed well, the steps comprising:
    providing a submerged pump connected to said wellhead for pumping said effluent at a predetermined pump pressure,
    providing a submerged electrical canned motor unit including a housing for operating said pump unit,
    supplying a single medium fluid through said submerged pump and said submerged electrical canned motor for cooling and lubricating said pump and said electrical canned motor,
    providing a submerged compensator means outside the housing of the submerged electrical canned motor, in fluid flow communication with the submerged pump and the submerged electrical canned motor, and responsive to said pump pressure for pressurizing said single medium fluid at a pressure above said pump pressure for conveying said single medium fluid through said submerged pump and said submerged electrical canned motor, and selecting said single medium fluid to be compatible with said effluent.

11. In a method of claim 10, wherein said effluent is a multiphase effluent comprising a plurality of fluids consisting of mixtures of water, oil, and gas, and wherein said single medium is oil.

12. In a method of claim 10, the steps further comprising: allowing said single medium to leak into said pump and into said effluent being pumped.

13. In a method of claim 12, the steps further comprising: providing a multiphase pump, pumping a multiphase effluent, and allowing said single medium to leak into said multiphase pump and into said multiphase effluent being pumped.

14. A sub-sea pumping system for pumping an effluent from a seabed well, comprising:

a motor-pump unit including a housing for pumping said effluent at a variable pressure, medium means for delivering a medium fluid into said motor-pump unit for cooling and lubricating said motor-pump unit, and a bellows assembly outside the housing of the motor-pump unit, in fluid flow communication with the motor-pump unit, and responsive to said pump pressure for conveying said medium fluid through said motor-pump unit at a substantially constant differential pressure above the variable pressure of the effluent for said cooling and lubricating of said motor-pump unit.

* * * * *